US006883773B1

(12) United States Patent
    Mattheis

(10) Patent No.: US 6,883,773 B1
(45) Date of Patent: Apr. 26, 2005

(54) PINCH VALVE

(75) Inventor: Harley Mattheis, Verona, NJ (US)

(73) Assignee: Gilwal Technologies, Franklinville, NJ (US)

( * ) Notice: Subject to any disclaimer, the term of this patent is extended or adjusted under 35 U.S.C. 154(b) by 0 days.

(21) Appl. No.: 10/760,686

(22) Filed: Jan. 20, 2004

(51) Int. Cl.$^7$ .............................................. F16K 7/04
(52) U.S. Cl. ....................................................... 251/7
(58) Field of Search ....................................... 251/4–8

(56) References Cited

U.S. PATENT DOCUMENTS

| | | | | |
|---|---|---|---|---|
| 48,421 | A | * | 6/1865 | Matthews, Jr. ................. 251/7 |
| 307,871 | A | * | 11/1884 | Richtmann ...................... 251/7 |
| 2,471,623 | A | * | 5/1949 | Hubbell ................. 137/625.18 |
| 3,262,670 | A | * | 7/1966 | Russell ........................... 251/7 |
| 4,634,092 | A | * | 1/1987 | Daniell et al. ................. 251/7 |
| 6,536,738 | B2 | * | 3/2003 | Inoue et al. .................... 251/5 |

* cited by examiner

Primary Examiner—Paul J. Hirsch
(74) Attorney, Agent, or Firm—Stuart M. Goldstein

(57) ABSTRACT

A pinch valve is provided which includes an outer housing into which lower and upper elements are positioned. A flexible, tubular shaped hose, duct, or similar conduit or line to be used under pressure is inserted into and maintained between a support section of the lower pinch element and a support section of the upper pinch element. A resilient spring located between the lower pinch element and the bottom surface of the outer housing compresses the flexible line into a closed position, in order to maintain an effective and leak proof closure of the line. When it is desired that the pressurized line be opened and fluid in the line be permitted to flow, an actuating button located atop the outer housing is pressed. The resulting pressure acts against the compressive force of this spring, causing the lower pinch element to move down within the housing, thereby opening the flexible line to permit fluid flow. When pressure is removed from the actuating button, the compressive force of the spring once again compels the lower pinch element upward, thereby closing the line.

26 Claims, 3 Drawing Sheets

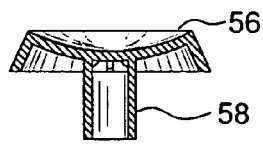
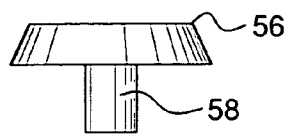
FIG. 1A  FIG. 1B
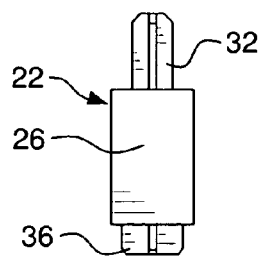
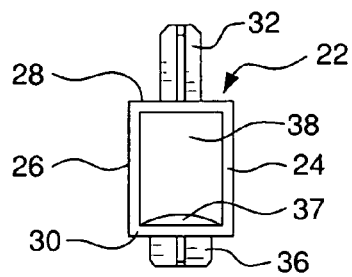
FIG. 2A  FIG. 2B
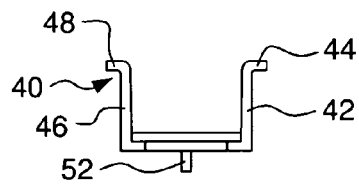
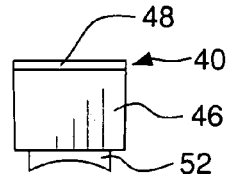
FIG. 3A  FIG. 3B
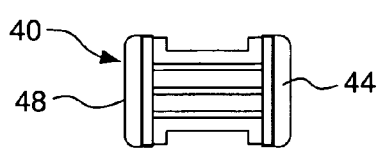
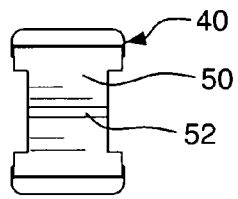
FIG. 3C  FIG. 3D
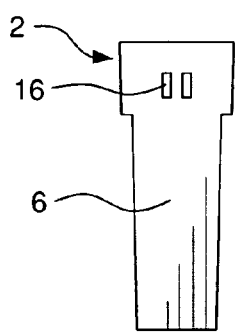
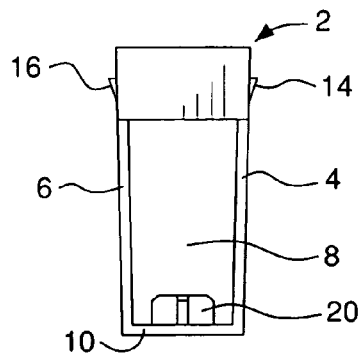
FIG. 4A  FIG. 4B

PINCH VALVE

BACKGROUND OF THE INVENTION

Pinch valves are generally provided to a continuous duct, tube, or other flexible conduit or line to control the flow of fluid through that line. Such valves control or terminate fluid flow by constricting or pinching the line, thus maintaining fluid under pressure within the line and upstream of the valve. While a number of different type of pinch valve designs are known, many of the existing pinch valves in use are either complicated in their design and construction, have too many component parts, or they are inefficient in actually maintaining the constriction in the line, thereby allowing leakage past the valve.

SUMMARY OF THE INVENTION

It is thus an object of the present invention to overcome the disadvantages and limitations of prior pinch valves.

It is an object of the present invention to provide a pinch valve which effectively and efficiently controls the flow of fluid through a line.

It is another object of the present invention to provide a pinch valve which effectively and efficiently constricts a flexible line, completely maintaining fluid under pressure upstream of the valve.

It is a further object of the present invention to provide a pinch valve which operates to constrict a line without the leakage of fluid from the upstream to the downstream side of the valve.

It is still another object of the present invention to provide a pinch valve which allows a line to automatically remain open but, during use of the valve, effectively closes the line.

It is still a further object of the present invention to provide a pinch valve which is simple in construction, comprising only a few component parts.

It is another object of the present invention to provide a pinch valve which is easy to install and to incorporate into a fluid system.

It is another object of the present invention to provide a pinch valve which can be fully operated by minimal actuating pressure.

These and other objects are accomplished by the present invention, a pinch valve with an outer housing into which lower and upper pinch elements are provided. A flexible, tubular shaped hose, duct, or similar conduit or line to be used under pressure is inserted into and maintained between a support section of the lower pinch element and a support section of the upper pinch element. A resilient spring located between the lower pinch element and the bottom surface of the outer housing compresses the flexible line into a closed position, in order to maintain an effective and leak proof closure of the line. When it is desired that the pressurized line be opened and fluid in the line be permitted to flow, an actuating button located atop the outer housing is pressed. The resulting pressure acts against the compressive force of this spring, causing the lower pinch element to move down within the housing, thereby opening the flexible line to permit fluid flow. When pressure is removed from the actuating button, the compressive force of the spring once again compels the lower pinch element upward, thereby closing the line.

Novel features which are considered as characteristic of the invention are set forth in particular in the attendant claims. The invention, itself, however both as to its design, construction and use, together with the additional features and advantages thereof, are best understood upon review of the following detailed description with reference to the accompanying drawings.

BRIEF DESCRIPTION OF THE DRAWINGS

FIG. 1 shows two views of the push button of the pinch valve of the present invention.

FIG. 2 shows two views of the lower pinch element of the pinch valve of the present invention.

FIG. 3 shows four views of the upper pinch element of the pinch valve of the present invention.

FIG. 4 shows two views of the outer housing of the pinch valve of the present invention.

DETAILED DESCRIPTION OF THE INVENTION

Figure 5:
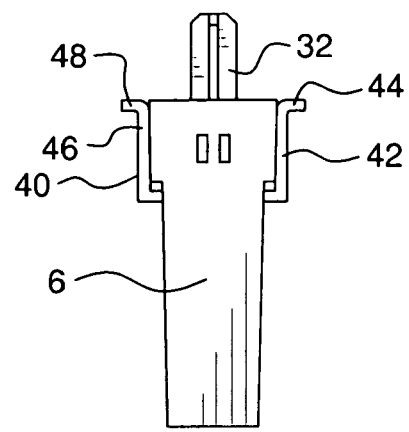
FIG. 5 shows a side view of the upper pinch element in position within the outer housing of the pinch valve of the present invention.
Figure 6:
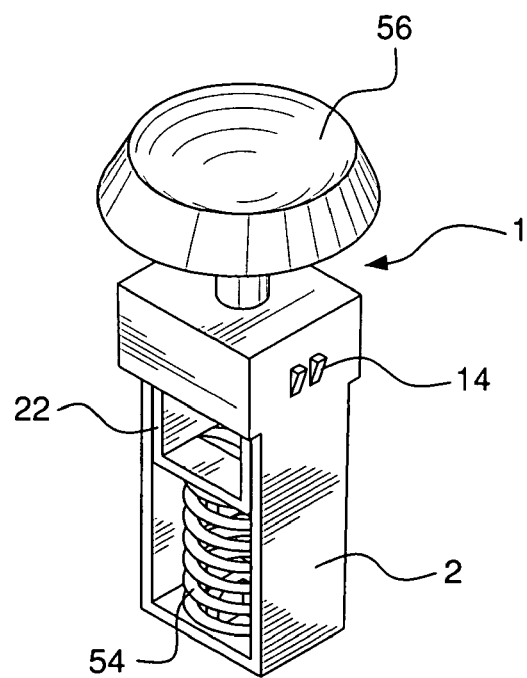
FIG. 6 is a perspective view of the fully assembled pinch valve of the present invention.

Pinch valve 1 comprises outer housing 2, the side view of which is shown in FIG. 5A and the front view of which is shown in FIG. 5B. Outer housing 2 has side walls 4 and 6, through-opening 8, and bottom surface 10. Outer housing 2 also has dual tabs 14 and 16 which are used to incorporate valve 1 into a tank or other system, such as at side wall 18. Guide post 20 is located on bottom surface 10 on outer housing 2.

Lower pinch element 22, the side view of which is shown in FIG. 2A and the front view of which is shown in FIG. 2B, is positioned within outer housing 2. Pinch element 22 comprises side walls 24 and 26, top surface 28 and bottom surface 30. Upper guidepost 32 extends from top surface 28 and lower guidepost 36 extends from bottom surface 30. Conduit or line supporting surface 37 extends upward from bottom surface 30. Lower pinch element 22 is positioned within outer housing 2, as shown in FIGS. 6–9. Opening 38 extends through pinch element 22.

Upper pinch element 40 is shown in FIG. 3A–3D. FIG. 3A is the front view of upper pinch element 40. FIG. 3B is the side view. FIG. 3C is the top view. And FIG. 3D is the bottom view. Upper pinch element 40 comprises side walls 42 with outwardly extending flange 44 and side wall 46 with outstanding flange 48. Extending from bottom surface 50 of upper pinch element 40 is conduit or line supporting surface 52. Upper pinch element 40 is inserted into opening 8 of outer housing 2, such that its side walls 42 and 46 are a plane perpendicular to the plane of side walls 4 and 6 of outer housing 2 and such that flanges 44 and 48 extend outwardly from the outer housing, as seen in FIG. 5.

Resiliently biased spring 54 is positioned over guideposts 20 and 32, such that the bias nature of the spring provides a compressive force against bottom surface 30 of lower pinch element 22.

Push button 56 comprises sleeve 58 configured to be placed over and keyed onto upper guidepost 32.

Figure 8:
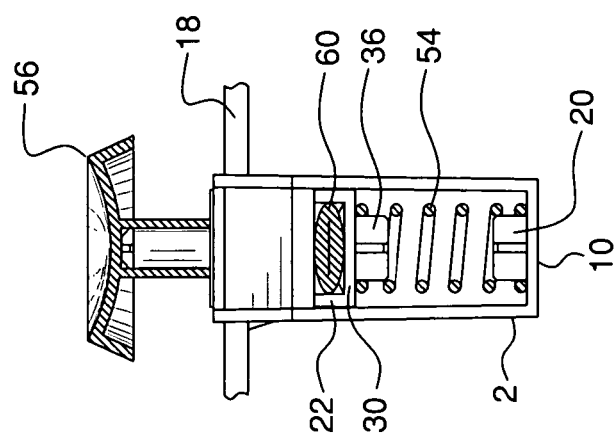
FIG. 8 is a cross-sectional side view of the pinch valve of the present invention in the closed position with flexible line inserted.
Figure 7:
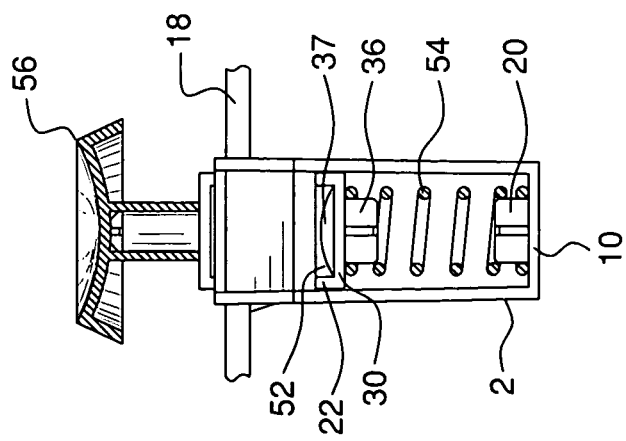
FIG. 7 is a cross-sectional side view of the pinch valve of the present invention in the closed position.

In normal use, valve unit 1 is placed into a tank or similar system such that tabs 14 and 16 are secured to side wall 18 of the tank or similar container. Hose 60 is inserted between line support surface 37 of lower pinch element 22 and line support surface 52 of upper pinch element 40 where it is maintained in this position. Under normal operating conditions which require line 60 to be closed, the compressive force of spring 54 acting against bottom surface 10 of outside housing 2 causes lower pinch element 22 to move upwards within outer housing 2, resulting in line support surface 37 compressing line 60 against line support surface 52 of upper pinch element 40. As seen in FIG. 8, this results in the constriction and closure of flexible line 60.

Figure 9:
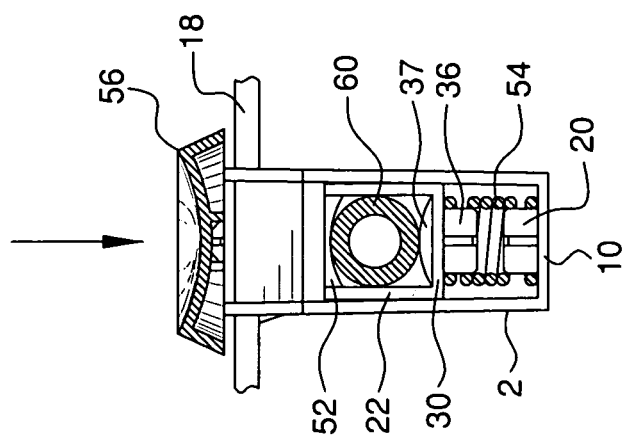
FIG. 9 is a cross-sectional side view of the pinch valve of the present invention in the open position, with inserted flexible line open.

When it is necessary to open line 60 to allow flow of fluid through the line, push button 56 is depressed. The resulting pressure on lower pinch element 22 causes it to travel downward, against the compressive force of spring 54. As seen in FIG. 9, as lower pinch element 22 continues its travel downward within outer housing 2, line 60 is opened, permitting the flow of fluid through the line.

When line 60 must again be closed, pressure is removed from push button 56, the compressive force from spring 54 again moves lower pinch element 22 upward within housing 2. This, once again, causes line 60 to be constricted and closed between line support surface 37 and line support surface 52.

The material and dimensions of line 60 and compressive force of spring 54, will, of course, be provided such that the force of the spring will be sufficient to completely close the flexible line when the biased spring is fully expanded. The physical characters of line 60 and spring 54 will also be such that upon application of pressure on push button 56, downward travel of lower pinch element 22 will allow opening of the line. The components' engineering and material specifications to accomplish these movements are not deemed part of the invention and thus are not included herein.

Thus, pinch valve 1 provides an effective and efficient valve closure assembly which has a minimal number of parts and, particularly, eliminates the need for hose fittings, clamps, and the like. Thus, not only are the number of parts minimized, which reduces assembly labor, but the lesser amount of parts also increases the value of the valve by reducing the number of joints and the number of locations of possible failure or leakage.

Certain novel features and components of this invention are disclosed in detail in order to make the invention clear in at least one form thereof. However, it is clearly to be understood that the invention as disclosed is not necessarily limited to the exact form and details as disclosed, since it is apparent that various modifications and changes may be made without the departing from the spirit of the invention.

What is claimed is:

1. A valve for controlling the flow of fluid through a flexible, tubular shaped line, said valve comprising:
    (a) lower housing means for receiving and maintaining a flexible, tubular shaped line in the valve, said lower housing means having first line supporting means for compressing the line upon the application of a compressive force on the line;
    (b) upper housing means for assisting in positioning the line in the valve, said upper housing means having second line supporting means for compressing the line upon the application of a compressive force in the line;
    (c) bias means for providing a compressive force to the line to pinch close the flexible line; and
    (d) actuating means for opening the line upon the application of pressure on the actuating means.

2. The valve as in claim 1 wherein the lower housing means further comprises guide means for providing maintaining the bias means within the valve.

3. The valve as in claim 1 further comprising outer housing means for encompassing the lower and upper housing means and the bias means.

4. The valve as in claim 3 wherein the outer housing means comprises guide means for providing maintaining the bias means within the outer housing.

5. The valve as in claim 4 wherein the lower housing means further comprises second guide means for maintaining the bias means within the outer housing.

6. The valve as in claim 1 wherein the lower housing further comprises extension means for receiving the actuating means and maintaining the actuating means in position on the valve.

7. The valve as in claim 1 wherein the bias means is a spring.

8. The valve as in claim 2 wherein the bias means is a spring.

9. The valve as in claim 3 wherein the bias means is a spring.

10. The valve as in claim 4 wherein the bias means is a spring.

11. The valve as in claim 5 wherein the bias means is a spring extending between the guide means of the outer housing means and the second guide means.

12. The valve as in claim 1 whereby upon the application of pressure on the actuating means the lower housing means is moved in opposition to the compressive force of the bias means to open the line.

13. The valve as in claim 3 whereby upon the application of pressure on the actuating means the lower housing means is moved in opposition to the compressive force of the bias means to open the line.

14. The valve as in claim 1 whereby the application of pressure on the actuating means moves the lower housing means against the bias means.

15. The valve as in claim 12 wherein the actuating means is a push button which moves the lower housing means through the outer housing means.

16. The valve as in claim 4 wherein the guide means of the outer housing comprises a guidepost over which the bias means is positioned.

17. The valve as in claim 5 wherein the guide means of the outer housing and the second guide means comprise guideposts over which the bias means is positioned.

18. The valve for controlling the flow of fluid through a flexible, tubular shaped line, said valve comprising:
    (a) an outer housing;
    (b) a lower pinch element substantially located in the housing, said pinch element having opening means for receiving and maintaining a flexible, tubular shaped line in the valve;
    (c) an upper pinch element substantially located in the housing;
    (d) bias means located within the housing providing a compressive force between the housing and the lower pinch element to pinch close the line; and
    (e) actuating means for opening the line upon the application of pressure on the actuating means.

19. The valve as in claim 18 whereby upon application of pressure on the actuating means, the lower pinch element is moved in opposition to the compressive force of the bias means to open the line.

20. The valve as in claim 19 wherein the upper pinch element is, at all times, fixed in position substantially within the housing.

21. The valve as in claim 18 wherein the housing and the lower pinch element each comprise guide means for maintaining the bias means between the housing and the lower pinch element.

22. The valve as in claim 18 wherein the lower and upper pinch elements each comprise line supporting surfaces for positioning and maintaining the flexible line within the valve.

23. The valve as in claim 18 wherein the bias means is a spring.

24. The valve as in claim 19 wherein the bias means is a spring.

25. The valve as in claim 21 wherein the bias means is a spring.

26. The valve as in claim 18 wherein the actuating means is a push button which moves the lower pinch element through the outer housing.

* * * * *